United States Patent
Hsin et al.

(10) Patent No.: US 8,503,276 B2
(45) Date of Patent: Aug. 6, 2013

(54) OPTICAL DISK DRIVE AND METHOD FOR DETERMINING TYPE OF A BLU-RAY DISK

(75) Inventors: Kuo-Ting Hsin, Zhubei (TW); Chi-Pei Huang, Miaoli (TW); Chao-Ming Huang, Hsin-Chu (TW)

(73) Assignee: Mediatek Inc., Hsin-Chu (TW)

( * ) Notice: Subject to any disclaimer, the term of this patent is extended or adjusted under 35 U.S.C. 154(b) by 259 days.

(21) Appl. No.: 12/873,529

(22) Filed: Sep. 1, 2010

(65) Prior Publication Data

US 2011/0158070 A1 Jun. 30, 2011

Related U.S. Application Data

(60) Provisional application No. 61/290,979, filed on Dec. 30, 2009.

(51) Int. Cl.
*G11B 7/00* (2006.01)
(52) U.S. Cl.
USPC .................. 369/53.23; 369/53.28; 369/94
(58) Field of Classification Search
USPC .................. 369/44.25, 53.23, 53.28, 94
See application file for complete search history.

(56) References Cited

U.S. PATENT DOCUMENTS

| | | | |
|---|---|---|---|
| 6,222,803 B1 * | 4/2001 | Uemura et al. | 369/44.29 |
| 6,777,657 B2 | 8/2004 | Nishio et al. | |
| 6,925,037 B2 | 8/2005 | Kishimoto et al. | |
| 7,009,925 B2 | 3/2006 | Lee | |
| 7,116,631 B2 | 10/2006 | Nishiuchi et al. | |
| 7,227,831 B2 | 6/2007 | Tokumoto | |
| 7,577,072 B2 | 8/2009 | Jin | |
| 7,613,091 B2 | 11/2009 | Shinotsuka et al. | |
| 2001/0006211 A1 * | 7/2001 | Choi et al. | 250/208.2 |
| 2003/0210619 A1 | 11/2003 | Kishimoto et al. | |
| 2004/0001410 A1 | 1/2004 | Yonezawa | |
| 2004/0165491 A1 | 8/2004 | Wang | |
| 2005/0030864 A1 | 2/2005 | Tokumoto | |
| 2005/0105320 A1 * | 5/2005 | Suh et al. | 365/145 |
| 2005/0117474 A1 | 6/2005 | Ishikawa et al. | |

(Continued)

FOREIGN PATENT DOCUMENTS

| | | |
|---|---|---|
| CN | 1606075 | 4/2005 |
| CN | 101256797 | 9/2008 |
| KR | 1020050075133 | 7/2005 |

OTHER PUBLICATIONS

English language translation of abstract of KR 1020050075133 (published Jul. 20, 2005).

(Continued)

*Primary Examiner* — Thomas Alunkal
(74) *Attorney, Agent, or Firm* — McClure, Qualey & Rodack, LLP (57) ABSTRACT

The invention provides a method for determining the layer type of a blu-ray disk. First, a laser beam is focused on a target layer of the blu-ray disk. Reflection of the laser beam from the target layer is the detected to obtain a reflection signal. The reflection signal is then processed to generate a first tracking error signal and a second tracking error signal. Magnitudes of the first tracking error signal and the second tracking error signal are then measured. The magnitude of the second tracking error signal is then subtracted from the magnitude of the first tracking error signal to obtain a difference value. Finally, the layer type of the target layer is determined by comparing the difference value with the first predetermined threshold.

16 Claims, 9 Drawing Sheets

U.S. PATENT DOCUMENTS

| | | |
|---|---|---|
| 2005/0237867 A1 | 10/2005 | Kuze et al. |
| 2006/0067191 A1* | 3/2006 | Jin .............................. 369/53.1 |
| 2007/0002699 A1* | 1/2007 | Suh ............................ 369/30.07 |
| 2007/0164241 A1* | 7/2007 | Nakano et al. ........... 250/559.36 |
| 2008/0013416 A1* | 1/2008 | Van Rompaey et al. ... 369/44.27 |
| 2008/0056094 A1 | 3/2008 | Nakao et al. |
| 2008/0151722 A1* | 6/2008 | Hara et al. ................. 369/53.23 |
| 2008/0205229 A1* | 8/2008 | Li et al. ..................... 369/53.23 |
| 2008/0285425 A1* | 11/2008 | Ichihara ................... 369/112.23 |
| 2010/0271918 A1 | 10/2010 | Feng et al. |
| 2011/0128833 A1* | 6/2011 | Nishiyama et al. ........ 369/44.26 |

OTHER PUBLICATIONS

English language translation of abstract of CN 101256797 (published Sep. 3, 2008).

* cited by examiner

OPTICAL DISK DRIVE AND METHOD FOR DETERMINING TYPE OF A BLU-RAY DISK

CROSS REFERENCE TO RELATED APPLICATIONS

This application claims the benefit of U.S. Provisional Application No. 61/290,979, filed on Dec. 30, 2009, the entirety of which is incorporated by reference herein.

BACKGROUND OF THE INVENTION

1. Field of the Invention

The invention relates to determination of layer types of optical disks, and more particularly to determination of layer types of blu-ray disks.

2. Description of the Related Art

An optical disk drive reads/writes data from/into a DVD disk with a laser beam of wavelength about 650 nm, or reads/writes data from/into a BD disk with a laser beam of wavelength about 405 nm. Thus, because optical disks of different types generates laser beam reflection with different wave lengths, when an optical disk is inserted into an optical disk drive, the wave length of the laser beam reflection from the optical disk can be used to determine whether the optical disk is a DVD disk or a BD disk. The wave length of a laser beam used to read./write data from/into the optical disk is therefore determined to be 650 nm corresponding to a DVD disk or 405 nm corresponding to a BD disk.

A multi layer blu-ray disk, BD Intra-Hybrid disc, may comprise multiple layers such as a BD-ROM (read only) layer or a BD-RE/R (rewritable) layer. When the optical disk drive determines an optical disk to be a blu-ray disk, the optical disk drive then determines the number of the layers of the blu-ray disk, and then determines the types of the layers of the blu-ray disk. When the layer of the blu-ray disk is a BD-ROM layer, the optical disk drive must generate a tracking error (TE) signal according to a differential-phase-detection (DPD) result, and then locks a projection trace of a laser beam on a track of the layer according to the tracking error signal. When the layer of the blu-ray disk is a BD-RE layer, the optical disk drive must generate a tracking error signal according to a differential-push-pull (DPP) result, and then lock a projection trace of a laser beam on a track of the layer according to the tracking error signal. If the tracking error signal is not generated according to a method corresponding to the layer type, the optical disk drive cannot lock the projection trace of the laser beam on a track of the layer.

Figure 1A:
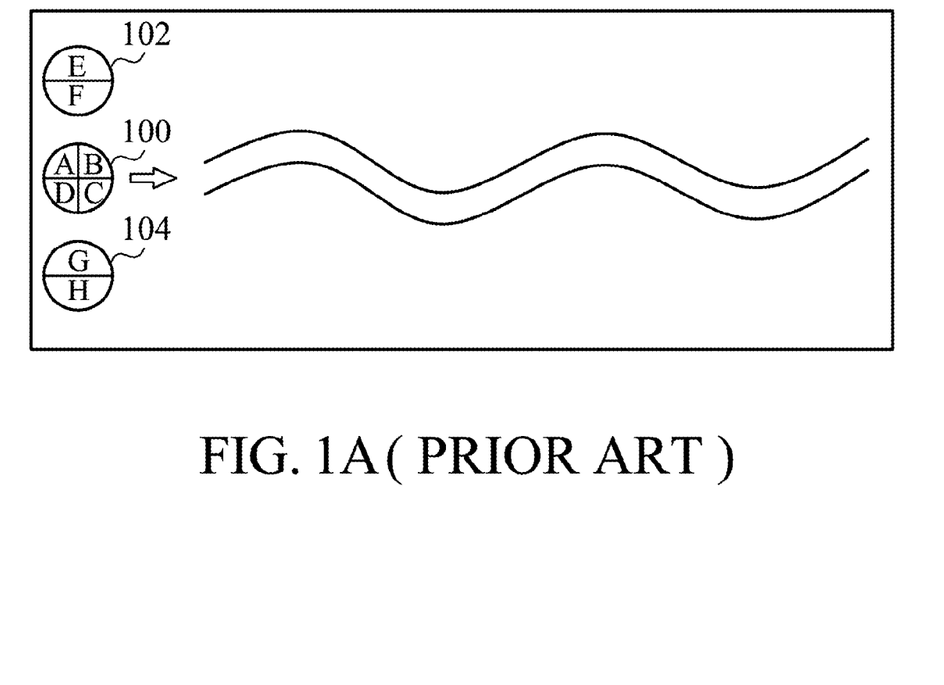
FIG. 1A is a schematic diagram for generating a tracking error signal according a differential push-pull (DPP) method.

Referring to FIG. 1A, a schematic diagram for generating a tracking error signal according a differential push-pull (DPP) method is shown. An optical disk drive projects a main-beam 100 and two sub-beams 102 and 104 on a track of a BD-RE layer of a blu-ray disk. A groove on the BD-RE layer forms the track. The main-beam 100 is projected on the groove of the track, and the two side-beams 102 and 104 are projected on the two sides of the groove. Four photodetectors respectively detect signal strength of a portion of reflection of the main-beam 100 to obtain signals A, B, C, and D. Two photodetectors detect signal strength of reflection of the sub-beam 102 to obtain signals E and F, and two photodetectors detect signal strength of reflection of the sub-beam 104 to obtain signals G and H. The sum of the signals C and D are then subtracted from the sum of the signals A and B to obtain a signal [(A+B)−(C+D)]. The sum of the signals E and G are then subtracted from the sum of the signals F and H to obtain a signal [(F+H)−(E+G)]. The signals [(A+B)−(C+D)] and [(F+H)−(E+G)] are then added to obtain a tracking error signal of a differential push-pull method.

Figure 1B:
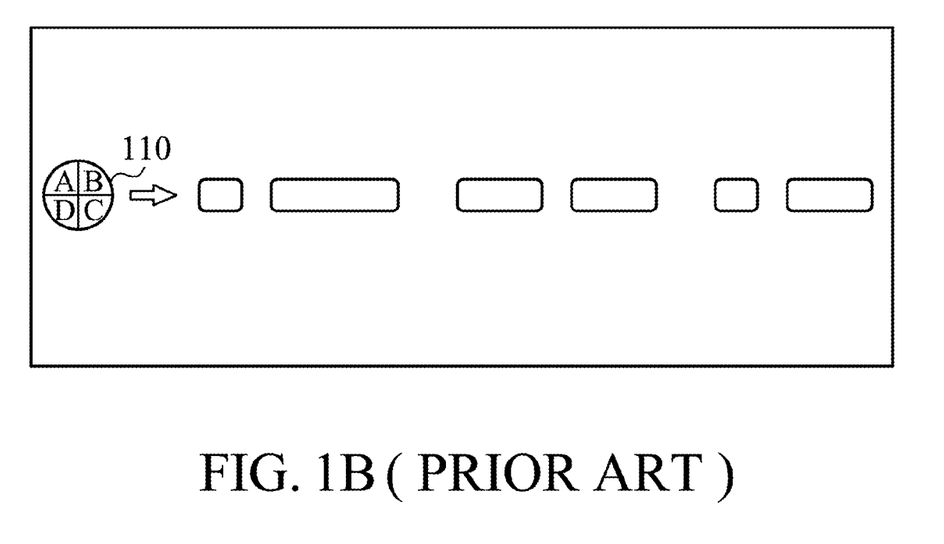
FIG. 1B is a schematic diagram for generating a tracking error signal according a differential phase detection (DPD) method.

Referring to FIG. 1B, a schematic diagram for generating a tracking error signal according a differential phase detection (DPD) method is shown. An optical disk drive projects a main-beam 100 on a track of a BD-ROM layer of a blu-ray disk. Data is Pre-recorded on a track on the BDROM layer in a form of a series of pits and lands which correspond to bits 0 and 1. The main-beam 100 is projected on the track, and four photodetectors respectively detect signal strength of a portion of reflection of the main-beam 100 to obtain signals A, B, C, and D. When the main-beam 100 moves along the track, the phases of the signals A, B, C, and D differ from each other, and the optical disk drive derives a tracking error signal from the phase difference between the signals A, B, C, and D according to a differential phase detection method.

When a blu-ray disk is inserted into an optical disk drive, the optical disk drive must first determine the type of the layer of the blu-ray disk, select a method for generating a tracking error signal from a differential phase detection method and a differential push-pull method according to the determined layer type, lock a trace of a laser beam on a track of the layer according to the generated tracking error signal, and then perform a servo calibration process according to reflection of the laser beam from the layer. If the type of the layer is incorrectly determined, the method for generating a tracking error method is also incorrectly selected according based on the wrong layer type, and the tracking error signal cannot be generated. The laser beam therefore cannot be locked on a track of the layer, leading to failure of the servo calibration process. Thus, a method for determining the layer type of a blu-ray disk is therefore required.

BRIEF SUMMARY OF THE INVENTION

The invention provides a method for determining the layer type of a blu-ray disk. First, a laser beam is focused on a target layer of the blu-ray disk. Reflection of the laser beam from the target layer is then detected to obtain a reflection signal. The reflection signal is then processed to generate a first tracking error signal and a second tracking error signal. Magnitudes of the first tracking error signal and the second tracking error signal are then measured. The magnitude of the second tracking error signal is then subtracted from the magnitude of the first tracking error signal to obtain a difference value. Finally, the layer type of the target layer is determined by comparing the difference of value with a first predetermined threshold.

The invention provides a method for determining the layer type of a blu-ray disk. First, a laser beam is focused on a target layer of the blu-ray disk. Reflection of the laser beam is then detected from the target layer to obtain a reflection signal. The reflection signal is then processed to generate a wobble signal. An envelope magnitude of the wobble signal is then calculated. The envelope magnitude is then compared with a predetermined threshold to generate a comparison result. Finally, the layer type of the target layer is determined according to the comparison result.

The invention provides an optical disk drive. In one embodiment, a laser beam is focused on a target layer of a blu-ray disk, and reflection of the laser beam from the target layer is detected to obtain a reflection signal. In one embodiment, the optical disk drive comprises a tracking error signal generating unit, a magnitude detection module, and a microprocessor. The tracking error signal generating unit processes the reflection signal to generate a first tracking error signal and a second tracking error signal. The magnitude detection module measures magnitudes of the first tracking error signal and the second tracking error signal. The microprocessor subtracts the magnitude of the second tracking error signal from the magnitude of the first tracking error signal to obtain a difference values, and determines the layer type of the target layer by comparing the difference value with a first predetermined threshold.

The invention provides an optical disk drive. n one embodiment, a laser beam is focused on a target layer of a blu-ray disk, and reflection of the laser beam from the target layer is detected to obtain a reflection signal. In one embodiment, the optical disk drive comprises a wobble generator, an envelope magnitude calculation module, and a microprocessor. The wobble generator processes the reflection signal to generate a wobble signal. The envelope magnitude calculation module calculates an envelope magnitude of the wobble signal. The microprocessor compares the envelope magnitude with a predetermined threshold to generate a comparison result, and determines the layer type of the target layer according to the comparison result.

The invention also provides a method for determining layer type of a blu-ray disk. In one embodiment, the blu-ray disk comprises a first layer and a second layer different to each other. Layer type of the first layer and the second layer are firet determined. When the first layer and the second layer are both determined to be BD-ROM layers, the blu-ray disk is decided to be a BD-ROM dual-layer disk. When the first layer and the second layer are both determined to be BD-RE/R layers, the blu-ray disk is decided to be a BD-RE/R dual-layer disk. When one of the first layer and the second layer is determined to be a BD-ROM layer and the other of the first layer and the second layer is determined to be a BD-RE/R layer, the blu-ray disk is decided to be an Intra-Hybrid blu-ray disk.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Multi-layer disks are divided into two categories. A multi-layer disk of a first category has layers of the same format, such as a BDROM DL disk (Blu-lay disk-read only type with double layers disk), a BDRE DL disk (Blu-lay disk-rewritable type with double layers disk), and a BDR DL disk (Blu-lay disk-type with double layers disk). A multi-layer disk of a second category has data layers of different formats, such as a BD hybrid disc which has a BDROM layer and a DVDROM layer or two DVDROM layers.

A laser beam is projected onto a BD hybrid disc, and a focusing error signal is derived from reflection of the laser beam. The focusing error signal of a blue laser beam (with wavelength of 405 nm) from a BD layer has a greater amplitude, and the focusing error signal of a red laser beam (with wavelength of 650 nm) from the BD layer has almost no amplitude. On the contrary, the focusing error signal of a red laser beam (with wavelength of 650 nm) from a DVD layer has a greater amplitude, and the focusing error signal of a blue laser beam (with wavelength of 405 nm) from the DVD layer has almost no amplitude. The layer types of the BD hybrid disc is thereby identified, and an optical disk drive can then choose a laser beam with a proper wavelength for accessing data from a target data layer of the BD hybrid disc, and then sets corresponding PDIC gain and servo path gain and performs calibration, focusing on/tracking on, and read address operations after servo on.

To determine a layer type of a multi-layer disk has layers of the same format, laser beams with different wavelengths are projected onto the multi-layer disk, and layer the layer type of the multi-layer disk is determined according to amplitudes of focusing error signals corresponding to the laser beams. In addition, a layer number of the multi-layer disk can be determined according to a count number of S-curves in the focusing error signal. For example, when a disk has a higher reflection rate to a blue laser beam (405 nm wave length), the disk is a BD type disk, such as a BD-ROM dual layer disk or a BD-R/RE dual-layer disk. The BD-ROM dual layer disk and the BD-R/RE dual-layer disk can be further differentiated according to a peak-to-peak amplitude of a focusing error signal. In a subsequent servo-on process, a PDIC gain of a pickup head and an initial gain of servo paths (such as FE/TE) are then determined according to the determined disk type. For example, because reflection rates of a BDROM disk and a BDR/RE disk are quite different, the PDIC gain of a pickup head is also set to different values corresponding to the BDROM and BDR/RE disks. Thus, a good SNR is ensured, and servo signals such as a focusing error signal and a tracking error signal are ensured of an enough path gain to enter a closed-loop mode.

A disk type of a BD Intra-Hybrid disc having a BDROM layer and a BDRE layer cannot be determined according to a conventional method. When the aforementioned conventional method is used to identify a disk type of the BD Intra-Hybrid disc, the aforementioned method fails to correctly identify the disk type by counting a number of S-curves in a focusing error signal and detecting a peak-to-peak amplitude of the focusing error signal. Because the reflection rate of the BD Intra-Hybrid disc is similar to that of a BDRE dual layer disk, the BD Intra-Hybrid disc would be misidentified as a BDR/RE Dual layer disk according to the conventional method.

When a BDROM layer of a BD Intra-Hybrid disc is accessed, a tracking error signal must be generated according to a DPD (Differential Phase Detection) method or result. When a BDRE layer of the BD Intra-Hybrid disc is accessed, a tracking error signal must be generated according to a DPP (Differential Push-Pull) method or result. When a data area of a BDRE layer of the BD Intra-Hybrid disc is read, a tracking error signal can be generated according to a DPD (Differential Phase Detection) method but has a smaller amplitude than that corresponding to a BDROM layer. When a blank area of a BDRE layer of the BD Intra-Hybrid disc is read, a tracking error signal generated according to a DPD (Differential Phase Detection) method has no amplitude. Thus, if a tracking error signal is generated according to a wrong method, the tracking error signal has small amplitude, leading to errors such as tracking-off problems.

If a BD Intra-Hybrid disc is misidentified as a BDRE dual layer disk, when servo calibration process is performed on a BDROM layer, a tracking error signal with small amplitude is generated according to a DPD (Differential Phase Detection) method, leading to track-off due to the small amplitude of the tracking error signal. The disk type is then changed to a BDRM dual layer, and a PDIC gain of the pickup head and initial gains of servo signal paths are set again according to the new disk types, leading to delay in a servo-on process.

If the BD Intra-Hybrid disc is misidentified as a BDROM dual layer disk, a tracking error signal is generated according to a DPD (Differential Phase Detection) method. When a blank area of the BD Intra-Hybrid disc is read, the tracking error signal has small amplitude, leading to tracking-off Even the optical disk drive reads lead-in information to know that the disk is a BD Intra-Hybrid disc, a servo calibration process needs to be performed again, resulting in a long delay.

Figure 2:
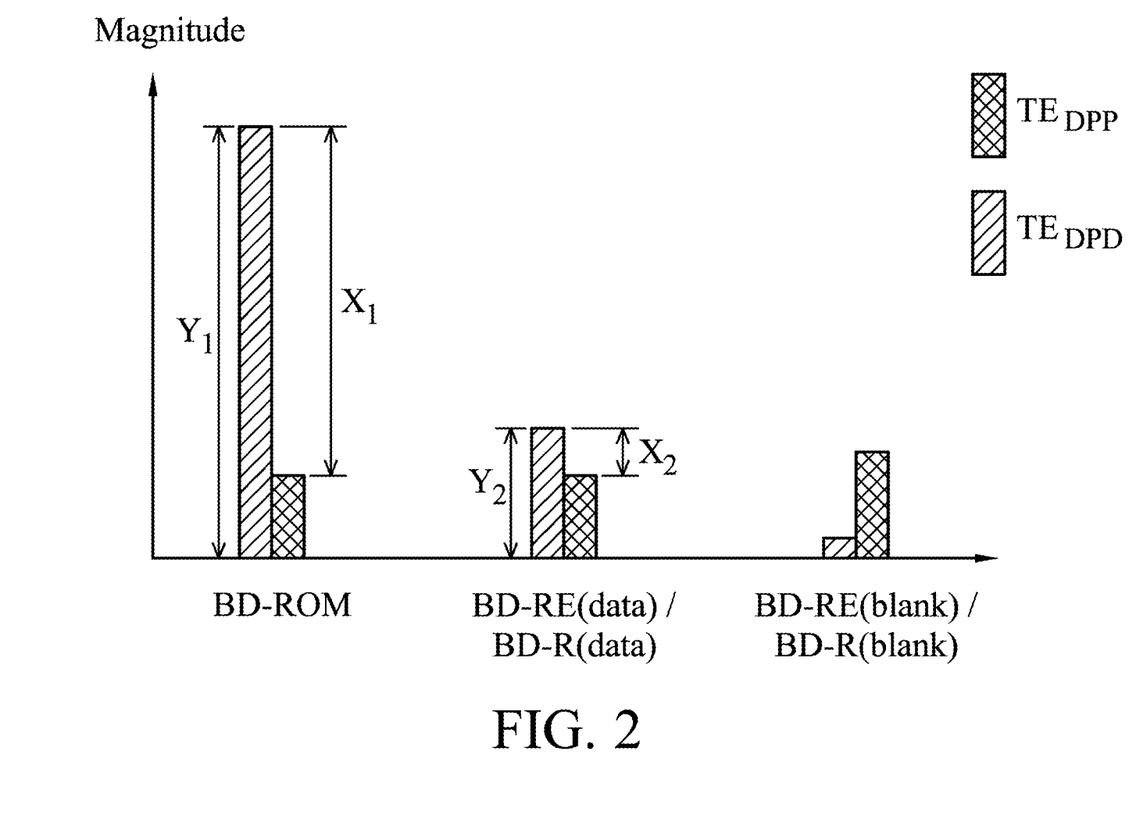
FIG. 2 is a schematic diagram of magnitudes of tracking error signals generated according to a differential phase detection method and a differential push-pull method.

Referring to FIG. 2, a schematic diagram of magnitudes of tracking error signals generated according to a differential phase detection method and a differential push-pull method is shown. When the layer of a blu-ray disk is a BD-ROM layer, a tracking error signal generated according to a differential phase detection method has a greater magnitude than that of a tracking error signal generated according to a differential push pull method. When the layer of a blu-ray disk is a BD-RE/R layer and a laser beam is projected on the data region of the layer, a tracking error signal generated according to a differential phase detection method has a slightly greater magnitude than that of a tracking error signal generated according to a differential push pull method. When the layer of a blu-ray disk is a BD-R/RE layer and a laser beam is projected on a blank region of the layer, a tracking error signal generated according to a differential push pull method has a greater magnitude than that of a tracking error signal generated according to a differential phase detection method.

According to the magnitudes of tracking error signals shown in FIG. 2, an optical disk drive can identify a type of the layer according to magnitudes of tracking error signals generated according to the differential phase detection (DPD) method and a differential push pull (DPP) method. A first difference value $X_1$ between the magnitudes of tracking error signals respectively generated by the DPD method and the DPP method according to reflection from a BD-ROM layer is calculated, and a second difference value $X_2$ between the magnitudes of tracking error signals respectively generated by the DPD method and the DPP method according to reflection from the data area of a BD-RE/R layer is calculated. A first predetermined threshold is then set to an average of the first difference value $X_1$ and the second difference value $X_2$. When an optical disk drive wants to determine a type of a target layer of a blu-ray disk, the optical disk drive generates tracking error signals according to a differential phase detection method and a differential push pull method, and measures the magnitudes of the tracking error signals. When the difference value between the magnitudes of the tracking error signals is greater than the first predetermined threshold, the type of the target layer is determined to be a BD-ROM layer. When the difference value between the magnitudes of the tracking error signals is less than the first predetermined threshold, the type of the target layer is determined to be a BD-RE/R layer.

In addition, a first magnitude $Y_1$ of a tracking error signal generated by the DPD method according to reflection from a BD-ROM layer is calculated, and a second magnitude $Y_2$ of a tracking error signal generated by the DPD method according to reflection from the data area of the BD-RE/R layer is also calculated. A second predetermined threshold is then set to an average of the first magnitude $Y_1$ and the second magnitude $Y_2$. When an optical disk drive wants to determine a type of a target layer of a blu-ray disk, the optical disk drive generates tracking error signals according to a differential phase detection method and a differential push pull method, and measures the magnitudes of the tracking error signals. When the magnitude of the tracking error signal generated according to the differential phase detection method is greater than the second predetermined threshold, the type of the target layer is determined to be a BD-ROM layer. When the magnitude of the tracking error signal generated according to the differential phase detection method is less than the second predetermined threshold, the type of the target layer is determined to be a BD-RE/R layer.

Figure 3:
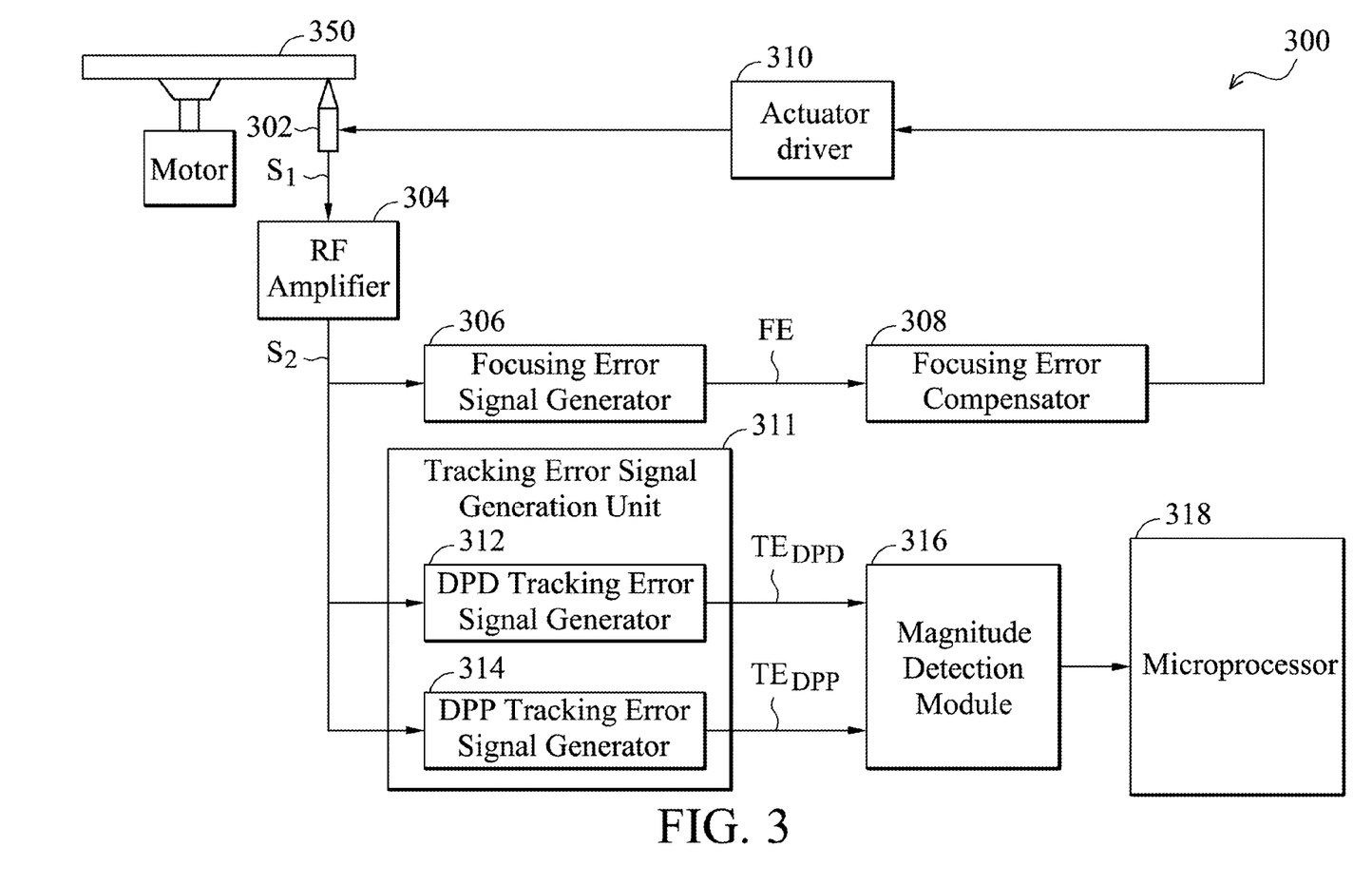
FIG. 3 is a block diagram of an optical disk drive according to the invention.

Referring to FIG. 3, a block diagram of an optical disk drive 300 according to the invention is shown. In one embodiment, the optical disk drive 300 comprises a pickup head 302, a radio frequency (RF) amplifier 304, a focusing error signal generator 306, a focusing error compensator 308, an actuator driver 310, a tracking error signal generation unit 311 (includes a differential-phase-detection tracking error signal generator 312, and a differential-push-pull tracking error signal generator 314), a magnitude detection module 316, and a microprocessor 318. When a blu-ray disk 350 is inserted into the optical disk drive 300, the pickup head 302 projects a laser beam on the blu-ray disk 350, and the actuator driver 310 moves the pickup head 302 towards the surface of the blu-ray disk 350. The pickup head 302 then detects reflection of the laser beam from the blu-ray disk 350 to obtain a reflection signal $S_1$, and the RF amplifier 304 amplifies the reflection signal $S_1$ to obtain a reflection signal $S_2$. The focusing error signal generator 306 then generates a focusing error signal FE according to the reflection signal $S_2$. The optical disk drive 300 can then count a number of S-curves in the focusing error signal FE to determine a number of layers of the blu-ray disk 350. The tracking error signal generation unit 311 then processes the reflection signal $S_2$ according to a differential-phase-detection method to generate a first tracking error signal $TE_{DPD}$ and processes the reflection signal $S_2$ according to a differential-push-pull method to generate a second tracking error signal $TE_{DPP}$.

Figure 4A:
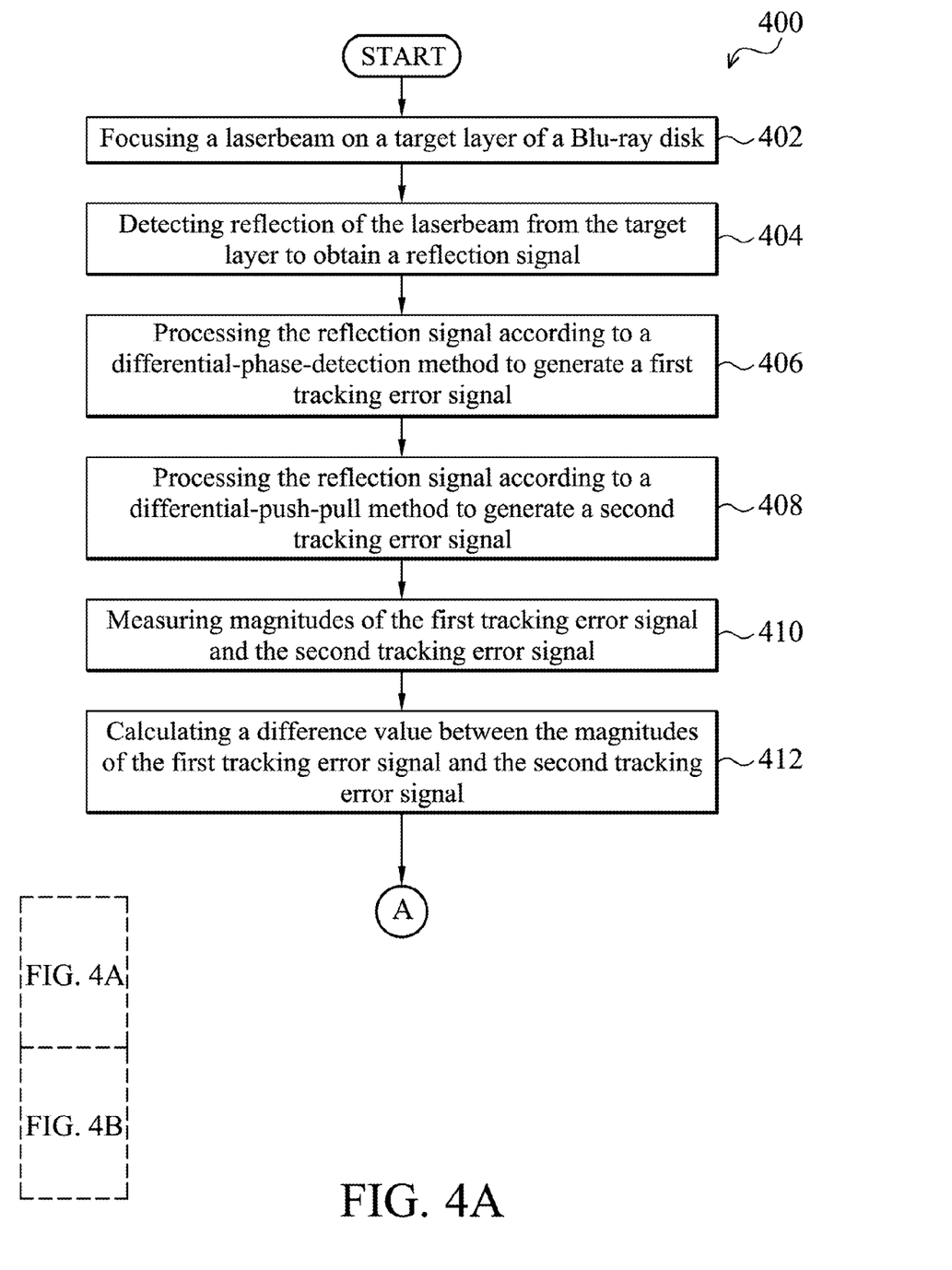
FIGS. 4A and 4B are a flowchart of a method for determining the layer type of a blu-ray disk according to the invention.
Figure 4B:
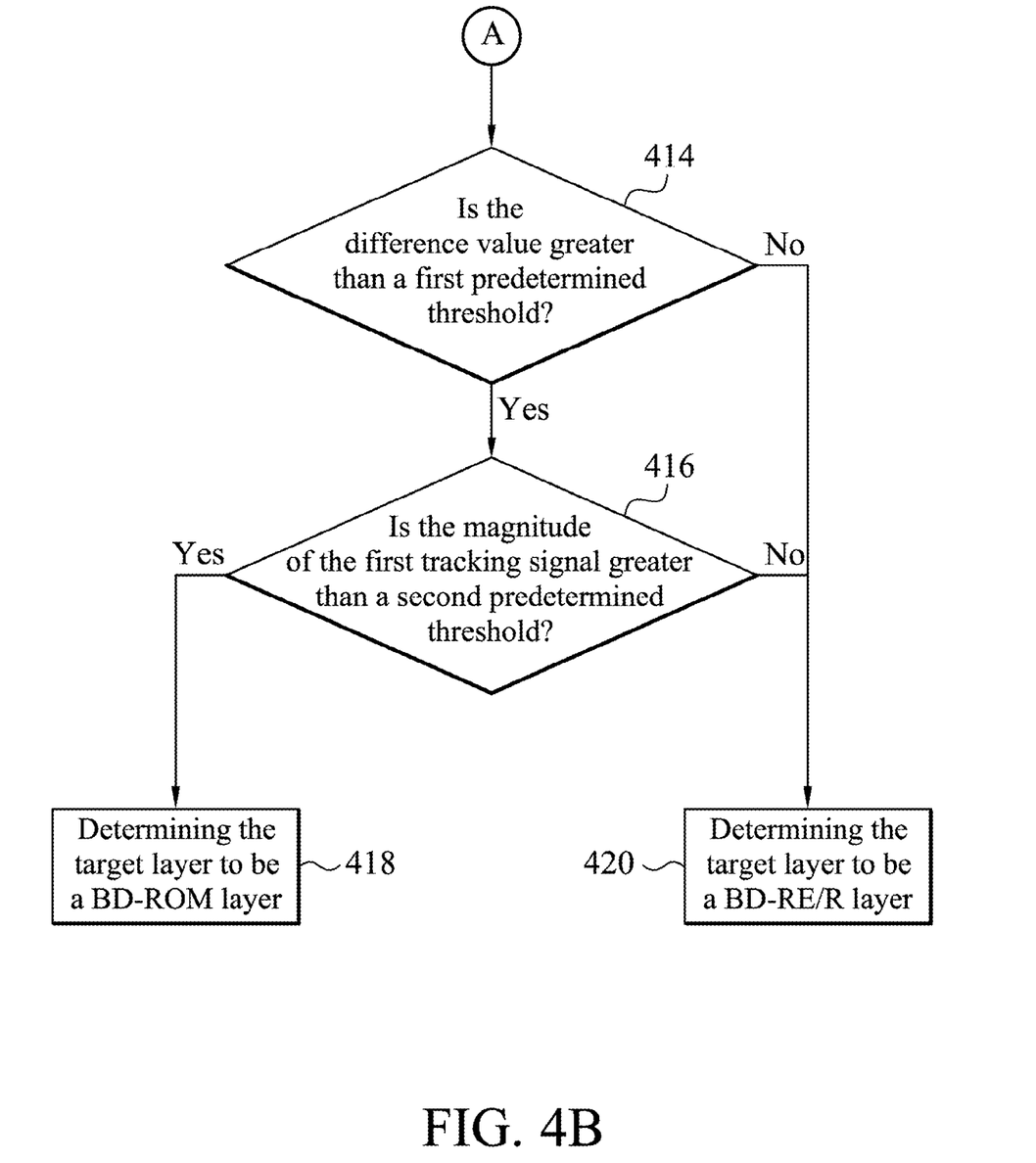

Referring to FIGS. 4A and 4B, a flowchart of a method 400 for determining the layer type of a blu-ray disk according to the invention is shown. The optical disk drive 300 then determines a type of a target layer of the blu-ray disk 350 according to the method 400. The focusing error compensator 308 first controls the actuator driver 310 to move the pickup head 302 according to the focusing error signal FE, thus focusing the laser beam emitted by the pickup head 302 on the target layer of the blu-ray disk 350 (step 402). The pickup head 302 then detects reflection of the laser beam from the target layer to obtain a reflection signal $S_1$ (step 404). The RF amplifier 304 then amplifies the reflection signal $S_1$ to obtain the reflection signal $S_2$. The differential-phase-detection tracking error signal generator 312 then processes the reflection signal $S_2$ according to a differential-phase-detection method to generate a first tracking error signal $TE_{DPD}$ (step 406). The differential-push-pull tracking error signal generator 314 then processes the reflection signal $S_2$ according to a differential-push-pull method to generate a second tracking error signal $TE_{DPP}$ (step 408). The magnitudes detection module 316 then measures magnitudes of the first tracking error signal $TE_{DPD}$ and the second tracking error signal $TE_{DPP}$ (step 410).

The microprocessor 318 then calculates the difference value between the magnitudes of the first tracking error signal $TE_{DPD}$ and the second tracking error signal $TE_{DPP}$ (step 412), and compares the difference value with the first predetermined threshold. When the difference value is less than the first predetermined threshold (step 414), the microprocessor 318 determines the target layer to be a BD-RE/R layer (step 420). When the difference value is greater than the first predetermined threshold (step 414), the microprocessor 318 further compares the magnitude of the first tracking error signal $TE_{DPD}$ with the second predetermined threshold (step 416). When the magnitude of the first tracking error signal $TE_{DPD}$ is greater than the second predetermined threshold (step 416), the microprocessor 318 determines the target layer to be a BD-ROM layer (step 418). When the magnitude of the first tracking error signal $TE_{DPD}$ is less than the second predetermined threshold (step 416), the microprocessor 318 determines the target layer to be a BD-RE/R layer (step 418).

Figure 5:
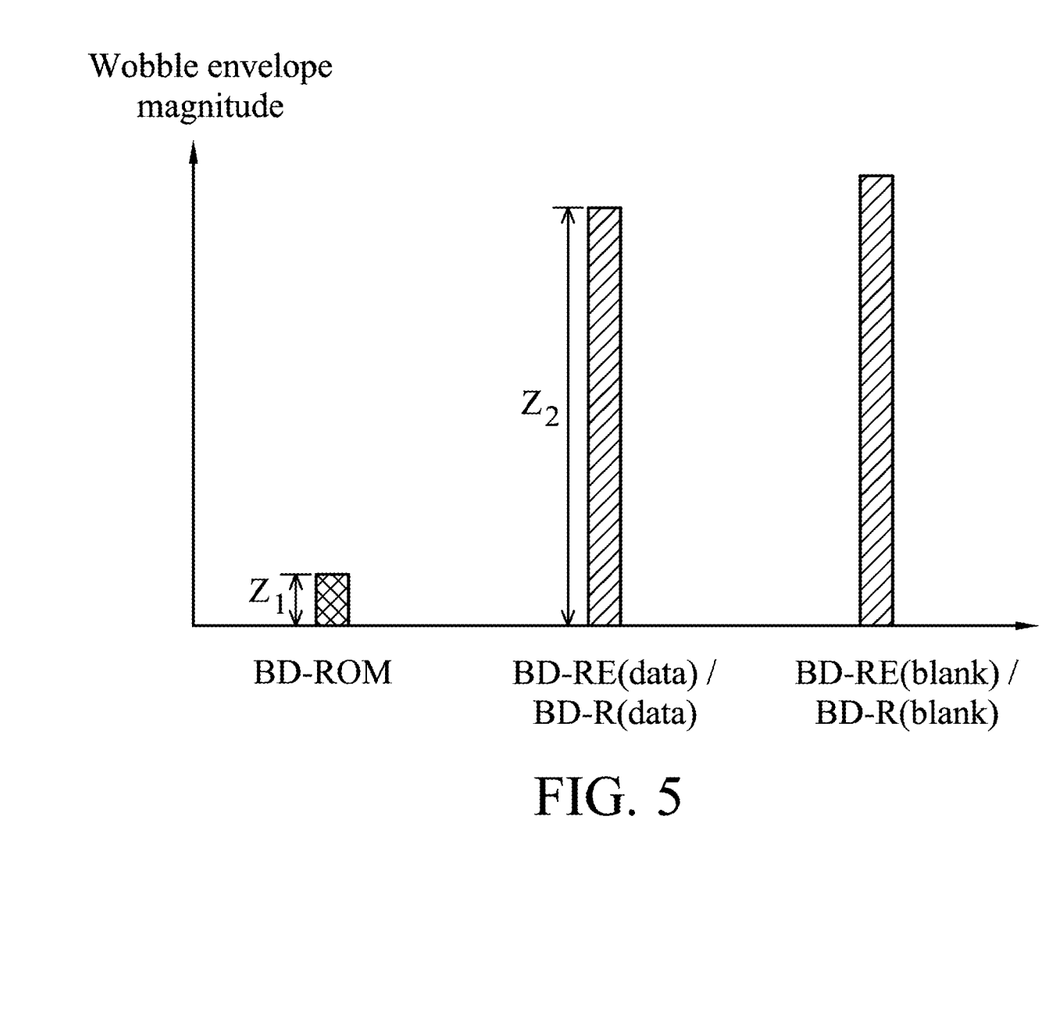
FIG. 5 is a schematic diagram of magnitudes of wobble signals generated according to reflection from BD-ROM and BD-RE/R layers.

In additional to the method 400 shown in FIG. 4, an optical disk drive can further determine the type of target layer of a blu-ray disk according to an envelope magnitude of a wobble signal read from the target layer. When the target layer is a BD-RE/R layer, because a track of the BD-RE/R layer oscillates from the center of the track, a wobble signal can be derived from the reflection from the track of the BD-RE/R layer. When the target layer is a BD-ROM layer, because a track of the BD-ROM layer does not oscillate, a wobble signal can not be derived from reflection from the track of the BD-ROM layer. Referring to FIG. 5, a schematic diagram of the magnitudes of wobble signals generated according to reflection from BD-ROM and BD-RE/R layers is shown. When the layer of a blu-ray disk is a BD-ROM layer, a wobble signal generated according to reflection from the layer has low amplitude. When the layer of a blu-ray disk is a BD-RE/R layer, a wobble signal generated according to reflection from the layer has high amplitude.

A first envelope magnitude $Z_1$ of a wobble signal generated according to reflection from a BD-ROM layer is calculated, and a second envelope magnitude $Z_2$ of a wobble signal generated according to reflection from a BD-RE/R layer is calculated. A predetermined threshold is then set to half of a difference between the first envelope magnitude $Z_1$ and the second envelope magnitude $Z_2$. When an optical disk drive wants to determine the type of a target layer of a blu-ray disk, the optical disk drive generates a wobble signal according to reflection a laser beam from the target layer, and measures the envelope magnitude of the wobble signal. When the envelope magnitude of the wobble signal is greater than the predetermined threshold, the type of the target layer is determined to be a BD-RE/R layer. When the envelope magnitude of the wobble signal is less than the predetermined threshold, the type of the target layer is determined to be a BD-ROM layer.

Figure 6:
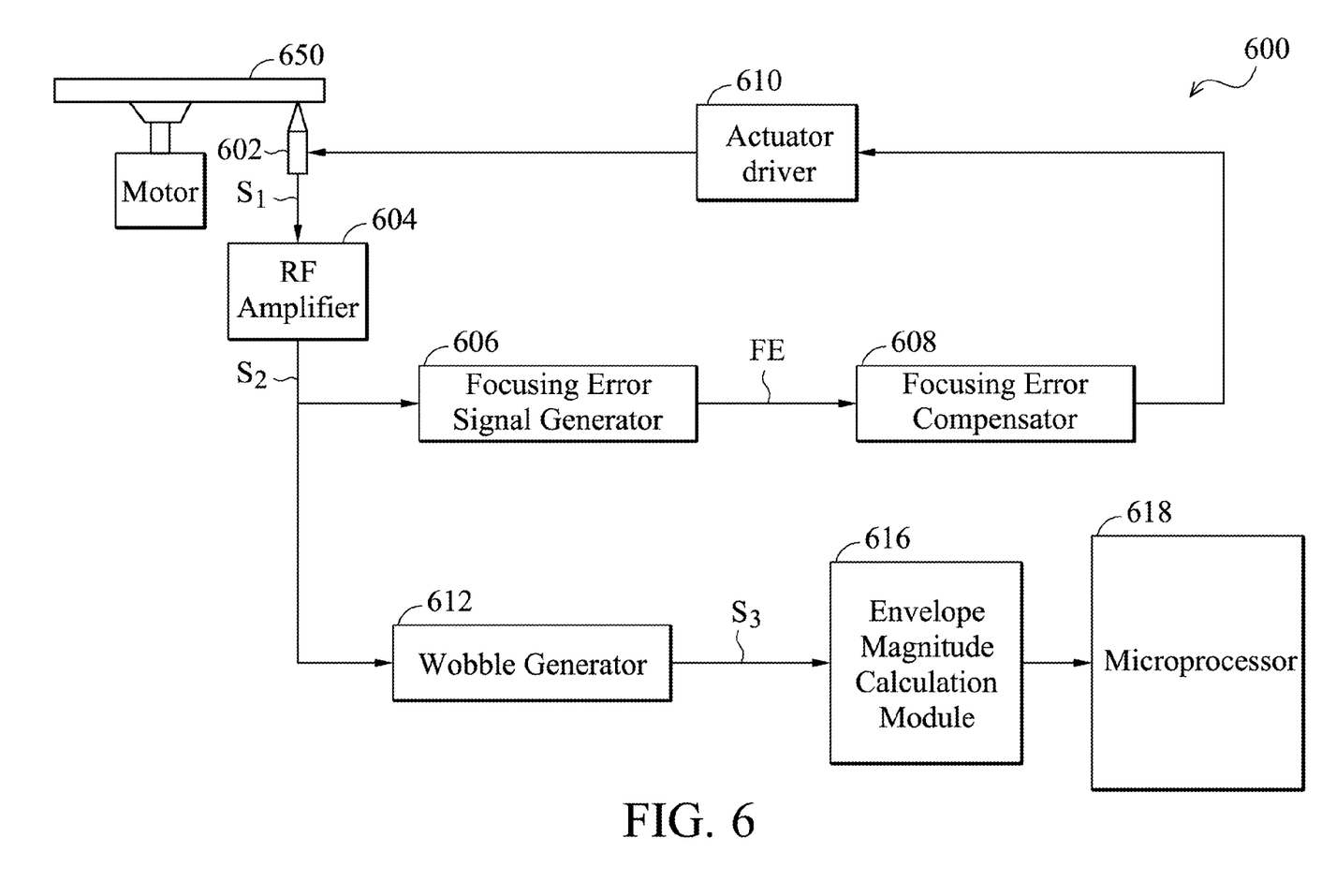
FIG. 6 is a block diagram of an optical disk drive according to the invention.

Referring to FIG. 6, a block diagram of an optical disk drive 600 according to the invention is shown. In one embodiment, the optical disk drive 600 comprises a pickup head 602, a radio frequency (RF) amplifier 604, a focusing error signal generator 606, a focusing error compensator 608, an actuator driver 610, a wobble generator 612, an envelope magnitude calculation module 616, and a microprocessor 618. When a blu-ray disk 650 is inserted into the optical disk drive 600, the pickup head 602 projects a laser beam on the blu-ray disk 650, and the actuator driver 610 moves the pickup head 602 towards the surface of the blu-ray disk 650. The pickup head 602 then detects reflection of the laser beam from the blu-ray disk 650 to obtain a reflection signal $S_1$, and the RF amplifier 604 amplifies the reflection signal $S_1$ to obtain a reflection signal $S_2$. The focusing error signal generator 606 then generates a focusing error signal FE according to the reflection signal $S_2$. The optical disk drive 600 can then count a number of S-curves in the focusing error signal FE to determine a number of layers of the blu-ray disk 650.

Figure 7:
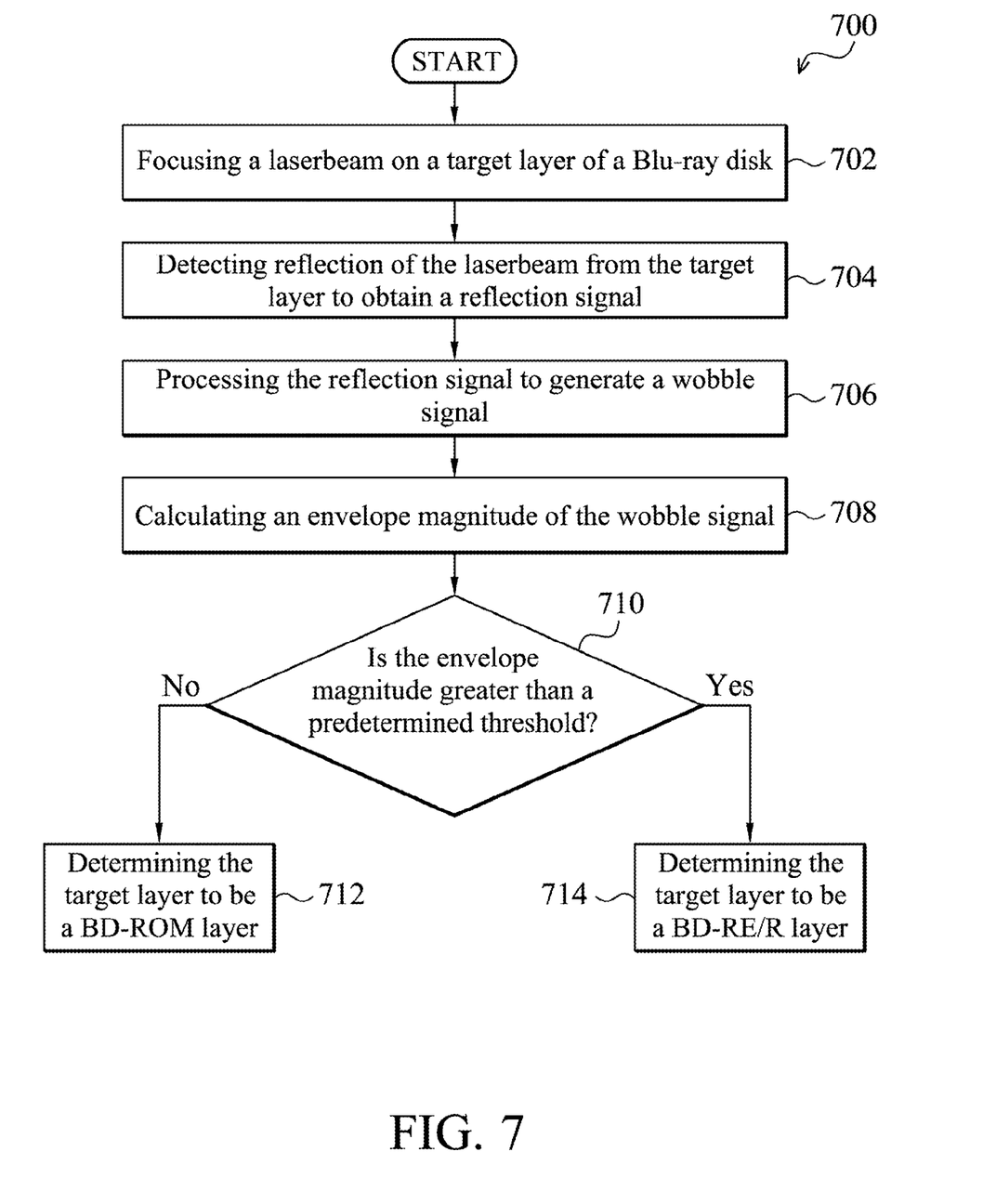
FIG. 7 is a flowchart of a method for determining the layer type of a blu-ray disk according to the invention.

Referring to FIG. 7, a flowchart of a method 700 for determining the layer type of a blu-ray disk according to the invention is shown. The optical disk drive 600 then determines a type of a target layer of the blu-ray disk 650 according to the method 700. The focusing error compensator 608 first controls the actuator driver 610 to move the pickup head 602 according to the focusing error signal FE, thus focusing the laser beam emitted by the pickup head 602 on the target layer of the blu-ray disk 650 (step 702). The pickup head 602 then detects reflection of the laser beam from the target layer to obtain a reflection signal $S_1$ (step 704). The RF amplifier 604 then amplifies the reflection signal $S_1$ to obtain the reflection signal $S_2$. The wobble generator 612 then processes the reflection signal $S_2$ to generate a wobble signal $S_3$ (step 706). The envelope magnitude calculation module 616 then calculates an envelope magnitude of the wobble signal $S_3$ (step 708). In one embodiment, the envelope magnitude calculation module 616 measures a series of peak values and a series of bottom values of the wobble signal $S_3$, subtracts the bottom values from the corresponding peak values to calculate a series of peak-to-bottom values, and selects a maximum value from the peak-to-bottom values as the envelope magnitude. The microprocessor 618 then compares the envelope magnitude with the predetermined threshold (step 710). When the envelope magnitude is less than the predetermined threshold (step 710), the microprocessor 618 determines the target layer to be a BD-ROM layer (step 712). When the envelope magnitude is greater than the predetermined threshold (step 710), the microprocessor 618 determines the target layer to be a BD-RE/R layer (step 714).

The invention provides two methods 400 and 700 to identify the type of the layer of a blu-ray disk. The two methods 400 and 700 combined or used individually to identify the type of the layer of a blu-ray disk. When the two methods 400 and 700 are combined, correct identification of the layer type of a blu-ray disk is improved. In one embodiment, when a difference value between magnitudes of the tracking error signals $TE_{DPD}$ and $TE_{DPP}$ is greater than the first predetermined threshold (step 414), the magnitude of the tracking error signal $TE_{DPD}$ is greater than the second predetermined threshold (step 416), and the envelope magnitude of the wobble signal is less than the predetermined threshold (step 710), the target layer is determined to be a BD-ROM layer. Otherwise, the target layer is determined to be a BD-RE/R layer.

Figure 8:
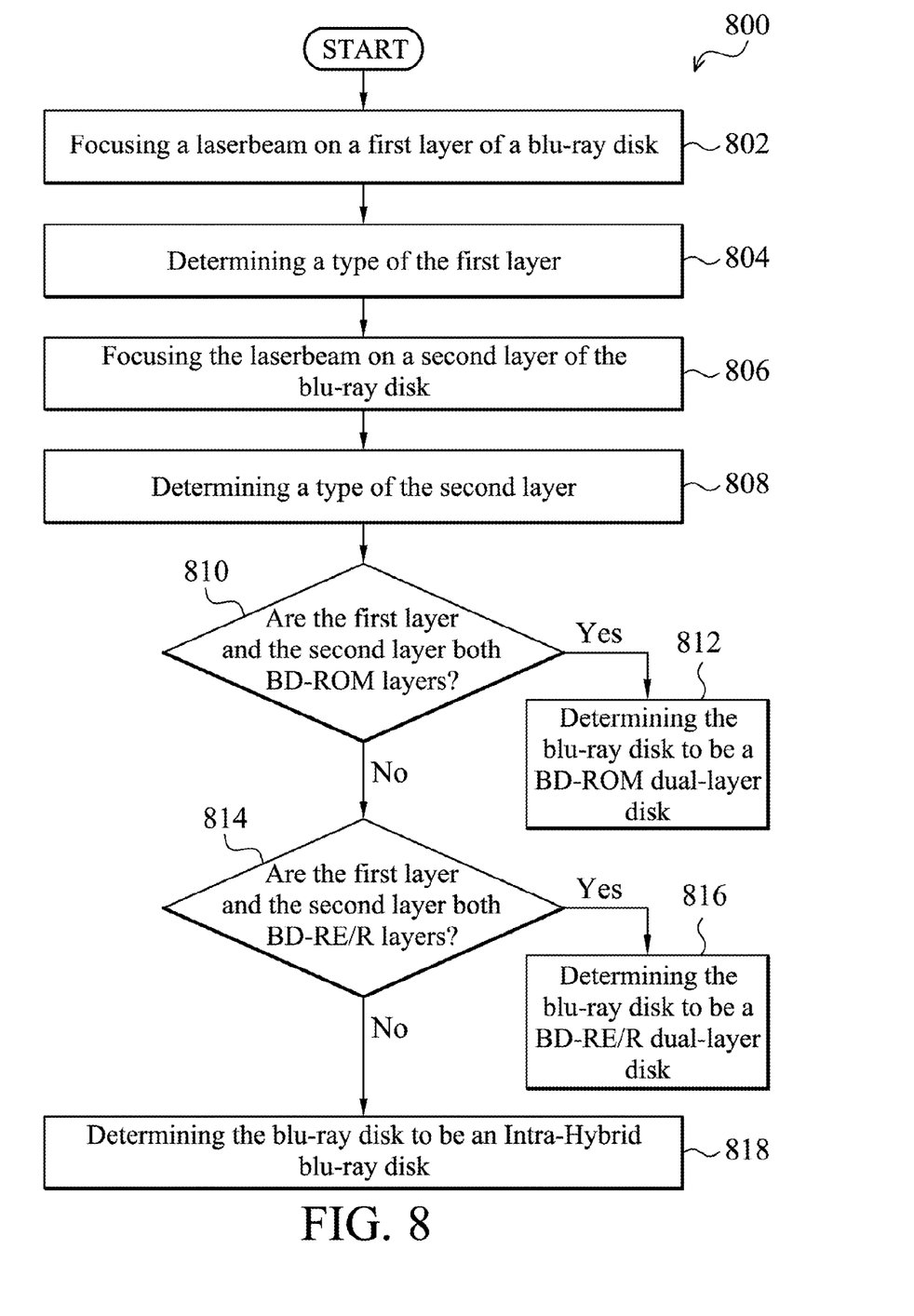
FIG. 8 is a flowchart of a method for determining a type of a blu-ray disk comprising two layers according to the invention.

A blu-ray disk may comprise two layers. The layers of the blu-ray disk may be a BD-ROM layer or a BD-RE/R layer. The methods 400 and 700 can therefore be used to identify the type of the blu-ray disk comprising two layers. Referring to FIG. 8, a flowchart of a method 800 for determining a type of a blu-ray disk comprising two layers according to the invention is shown. First, the optical disk drive focuses a laser beam on a first layer of the blu-ray disk (step 802). The optical disk drive then determines the type of the first layer according to the method 400 shown in FIG. 4, the method 700 shown in FIG. 7, or a method combining the steps of the methods 400 and 700 (step 804). After the type of the first layer is determined, the optical disk drive then focuses the laser beam on a second layer of the blu-ray disk (step 806). The optical disk drive then determines a type of the second layer according to the method 400 shown in FIG. 4, the method 700 shown in FIG. 7, or a method combining the steps of the methods 400 and 700 (step 808).

After the types of the first layer and the second layer are determined, the optical disk drive can then determine the type of the blu-ray disk according to the types of the first layer and the second layer. When the first layer and the second layer are both BD-ROM layers (step 810), the blu-ray disk is determined to be a BD-ROM dual-layer disk (step 812). When the first layer and the second layer are both BD-RE/R layers (step 814), the blu-ray disk is determined to be a BD-RE/R dual-layer disk (step 816). When one of the two layers is a BD-ROM layer, and the other of the two layers is a BD-RE/R layer (step 814), the blu-ray disk is determined to be an Intra-Hybrid blu-ray disk (step 818). After the type of the blu-ray disk is determined according to the method 800, the optical disk drive can then properly select a method for generating a tracking error signal from a differential phase detection method and a differential push-pull method according to the determined type of blu-ray disk, lock a trace of a laser beam on tracks of the layers of the blu-ray disk according to the generated tracking error signal, and then successfully perform a servo calibration process according to reflection of the laser beam from the layers.

According to a specification of a BD Intra-Hybrid disc, the BD Intra-Hybrid disc of a later version may comprise more than three data layers. For example, the BD Intra-Hybrid disc may comprise multiple ROM layers and multiple 'R' or 'RE' layers. There can also be a BD multi layer disc comprising multiple layers of 'R' or 'RE' format. According to the invention, to identify a disk type of a multiple layer disk, laser beams are respectively focused on only two layers or more than two layers of the multiple layer disk, and properties of physical signals derived from reflection are used to determine the disk type of the multiple layer disk. The physical signal may be a tracking error signal generated according to a DPP method or a DPD method or a wobble signal.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for determining layer type of a blu-ray disk, comprising:
   focusing a laser beam on a target layer of the blu-ray disk;
   detecting reflection of the laser beam from the target layer to obtain a reflection signal;
   processing the reflection signal to generate a first tracking error signal and a second tracking error signal;
   measuring magnitudes of the first tracking error signal and the second tracking error signal;
   subtracting the magnitude of the second tracking error signal from the magnitude of the first tracking error signal to obtain a difference value; and
   determining a layer type of the target layer by comparing the difference value with a first predetermined threshold, wherein the layer type is a format of the target layer.

2. The method as claimed in claim 1, wherein the first tracking error signal is generated according to a differential-phase-detection (DPD) result, and the second tracking error signal is generated according to a differential-push-pull (DPP) result.

3. The method as claimed in claim 1, wherein determination of the layer type comprises:
   when the difference value is greater than the first predetermined threshold, determining the target layer to be a BD-ROM layer; and
   when the difference value is less than the first predetermined threshold, determining the target layer to be a BD-RE/R layer.

4. The method as claimed in claim 3, wherein a first difference value between the magnitudes of tracking error signals respectively generated by a DPD result and a DPP result according to reflection from a BD-ROM layer is calculated, a second difference value between the magnitudes of tracking error signals respectively generated by the DPD result and the DPP result according to reflection from the data area of a BD-RE/R layer is calculated, and the first predetermined threshold is an average of the first difference value and the second difference value.

5. The method as claimed in claim 1, wherein determination of the layer type comprises:
   when the difference value is greater than the first predetermined threshold, comparing the magnitude of the first tracking error signal with a second predetermined threshold;
   when the magnitude of the first tracking error signal is greater than the second predetermined threshold, determining the target layer to be a BD-ROM layer; and
   when the magnitude of the first tracking error signal is less than the second predetermined threshold, or when the difference value is less than the first predetermined threshold, determining the target layer to be a BD-RE layer or a BD-R layer.

6. The method as claimed in claim 5, wherein a first difference value between the magnitudes of tracking error signals respectively generated by a DPD result and a DPP result according to reflection from a BD-ROM layer is calculated, a second difference value between the magnitudes of tracking error signals respectively generated by the DPD result and the DPP result according to reflection from the data area of a BD-RE/R layer is calculated, and the first predetermined threshold is an average of the first difference value and the second difference value.

7. The method as claimed in claim 5, wherein a first magnitude of a tracking error signal generated by a DPD result according to reflection from a BD-ROM layer is calculated, a second magnitude of a tracking error signal generated by a DPD result according to reflection from the data area of a BD-RE/R layer is also calculated, and the second predetermined threshold is an average of the first magnitude and the second magnitude.

8. An optical disk drive, wherein a laser beam is focused on a target layer of a blu-ray disk, and reflection of the laser beam from the target layer is detected to obtain a reflection signal, the optical disk drive comprising:
   a tracking error signal generation unit, processing the reflection signal to generate a first tracking error signal and a second tracking error signal;

a magnitude detection module, measuring magnitudes of the first tracking error signal and the second tracking error signal; and a microprocessor, subtracting the magnitude of the second tracking error signal from the magnitude of the first tracking error signal to obtain a difference value, and determining layer type of the target layer by comparing the difference value with a first predetermined threshold, wherein the layer type is a format of the target layer.

9. The optical disk drive as claimed in claim 8, wherein the tracking error signal generation unit comprises a first tracking error signal generator to generate the first tracking error signal according to a differential-phase-detection (DPD) result, and comprises a second tracking error signal generator to generate the second tracking error signal according to a differential-push-pull (DPP) result.

10. The optical disk drive as claimed in claim 8, wherein the microprocessor determines the target layer to be a BD-ROM layer when the difference value is greater than the first predetermined threshold, and determines the target layer to be a BD-RE/R layer when the difference value is less than the first predetermined threshold.

11. The optical disk drive as claimed in claim 10, wherein a first difference value between the magnitudes of tracking error signals respectively generated by a DPD result and a DPP result according to reflection from a BD-ROM layer is calculated, a second difference value between the magnitudes of tracking error signals respectively generated by the DPD result and the DPP result according to reflection from the data area of a BD-RE/R layer is calculated, and the first predetermined threshold is an average of the first difference value and the second difference value.

12. The optical disk drive as claimed in claim 8, wherein the microprocessor compares the magnitude of the first tracking error signal with a second predetermined threshold when the difference value is greater than the first predetermined threshold, determines the target layer to be a BD-ROM layer when the magnitude of the first tracking error signal is greater than the second predetermined threshold, and determines the target layer to be a BD-RE layer or a BD-R layer when the magnitude of the first tracking error signal is less than the second predetermined threshold or when the difference value is less than the first predetermined threshold.

13. The optical disk drive as claimed in claim 12, wherein a first difference value between the magnitudes of tracking error signals respectively generated by a DPD result and a DPP result according to reflection from a BD-ROM layer is calculated, a second difference value between the magnitudes of tracking error signals respectively generated by the DPD result and the DPP result according to reflection from the data area of a BD-RE/R layer is calculated, and the first predetermined threshold is an average of the first difference value and the second difference value.

14. The optical disk drive as claimed in claim 12, wherein a first magnitude of a tracking error signal generated by a DPD result according to reflection from a BD-ROM layer is calculated, a second magnitude of a tracking error signal generated by a DPD resulted according to reflection from the data area of a BD-RE/R layer is also calculated, and the second predetermined threshold is an average of the first magnitude and the second magnitude.

15. The optical disk drive as claimed in claim 8, wherein the blu-ray disk comprises a first layer and a second layer, the tracking error signal generation unit, the magnitude detection module, and the microprocessor cooperates to determine the layer type of the first layer and determine the layer type of the second layer, and the microprocessor determines the blu-ray disk to be a BD-ROM dual-layer disk when the first layer and the second layer are both determined to be BD-ROM layers, determines the blu-ray disk to be a BD-RE/R dual-layer disk when the first layer and the second layer are both determined to be BD-RE/R layers, and determines the blu-ray disk to be an Intra-Hybrid blu-ray disk when one of the first layers and the second layers is determined to be a BD-ROM layer and the other of the first layers and the second layers is determined to be a BD-RE/R layer.

16. A method for determining layer type of a blu-ray disk, wherein the blu-ray disk comprises a first layer and a second layer different to each other, and the method further comprises:

determining layer type of the first layer and the second layer;

when the first layer and the second layer are both determined to be BD-ROM layers, the blu-ray disk is decided to be a BD-ROM dual-layer disk;

when the first layer and the second layer are both determined to be BD-RE/R layers, the blu-ray disk is decided to be a BD-RE/R dual-layer disk; and when one of the first layer and the second layer is determined to be a BD-ROM layer and the other of the first layer and the second layer is determined to be a BD-RE/R layer, the blu-ray disk is decided to be an Intra-Hybrid blu-ray disk, wherein determination of the type of the first layer and the second layer comprises:

focusing a laser beam on a target layer of the blu-ray disk, wherein the target layer is the first layer or the second layer;

detecting reflection of the laser beam from the target layer to obtain a reflection signal;

processing the reflection signal to generate a first tracking error signal and a second tracking error signal;

measuring magnitudes of the first tracking error signal and the second tracking error signal;

subtracting the magnitude of the second tracking error signal from the magnitude of the first tracking error signal to obtain a difference value; and determining the layer type of the target layer by comparing the difference value with a first predetermined threshold.

* * * * *